United States Patent
Ikeda et al.

(10) Patent No.: US 10,079,141 B2
(45) Date of Patent: Sep. 18, 2018

(54) ULTRAVIOLET LIGHT-GENERATING TARGET AND METHOD FOR MANUFACTURING THE SAME, AND ELECTRON BEAM-EXCITED ULTRAVIOLET LIGHT SOURCE

(71) Applicant: HAMAMATSU PHOTONICS K.K., Hamamatsu-shi, Shizuoka (JP)

(72) Inventors: Kohei Ikeda, Hamamatsu (JP); Norio Ichikawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/854,178

(22) Filed: Dec. 26, 2017

(65) Prior Publication Data

US 2018/0182609 A1   Jun. 28, 2018

(30) Foreign Application Priority Data

Dec. 28, 2016   (JP) .................................. 2016-255811

(51) Int. Cl.
| | | |
|---|---|---|
| *H01J 29/70* | (2006.01) | |
| *H01J 63/06* | (2006.01) | |
| *H01J 1/63* | (2006.01) | |
| *C09K 11/64* | (2006.01) | |
| *C09K 11/77* | (2006.01) | |

(52) U.S. Cl.
CPC .............. *H01J 63/06* (2013.01); *C09K 11/64* (2013.01); *C09K 11/7706* (2013.01); *H01J 1/63* (2013.01)

(58) Field of Classification Search
CPC ......... H01J 63/06; H01J 1/63; C09K 11/7706; C09K 11/64
See application file for complete search history.

(56) References Cited

FOREIGN PATENT DOCUMENTS

| | | | | |
|---|---|---|---|---|
| JP | 2013-245292 A | 12/2013 | | |
| JP | 2013245292 | * 12/2013 | ............. | C09K 11/08 |

OTHER PUBLICATIONS

Bin Li et al., "Ultraviolet emission and Fano resonance in doped nano-alumina," Journal of Applied Physics, 2007, pp. 053534-1-053534-8, vol. 101.

* cited by examiner

*Primary Examiner* — Donald Raleigh
(74) *Attorney, Agent, or Firm* — Drinker Biddle & Reath LLP

(57) ABSTRACT

An ultraviolet light-generating target comprising a substrate transmitting ultraviolet light; and a light-emitting layer provided on the substrate and emitting ultraviolet light in response to an electron beam, wherein the light-emitting layer is an amorphous layer formed of $Al_2O_3$ doped with Sc.

9 Claims, 15 Drawing Sheets

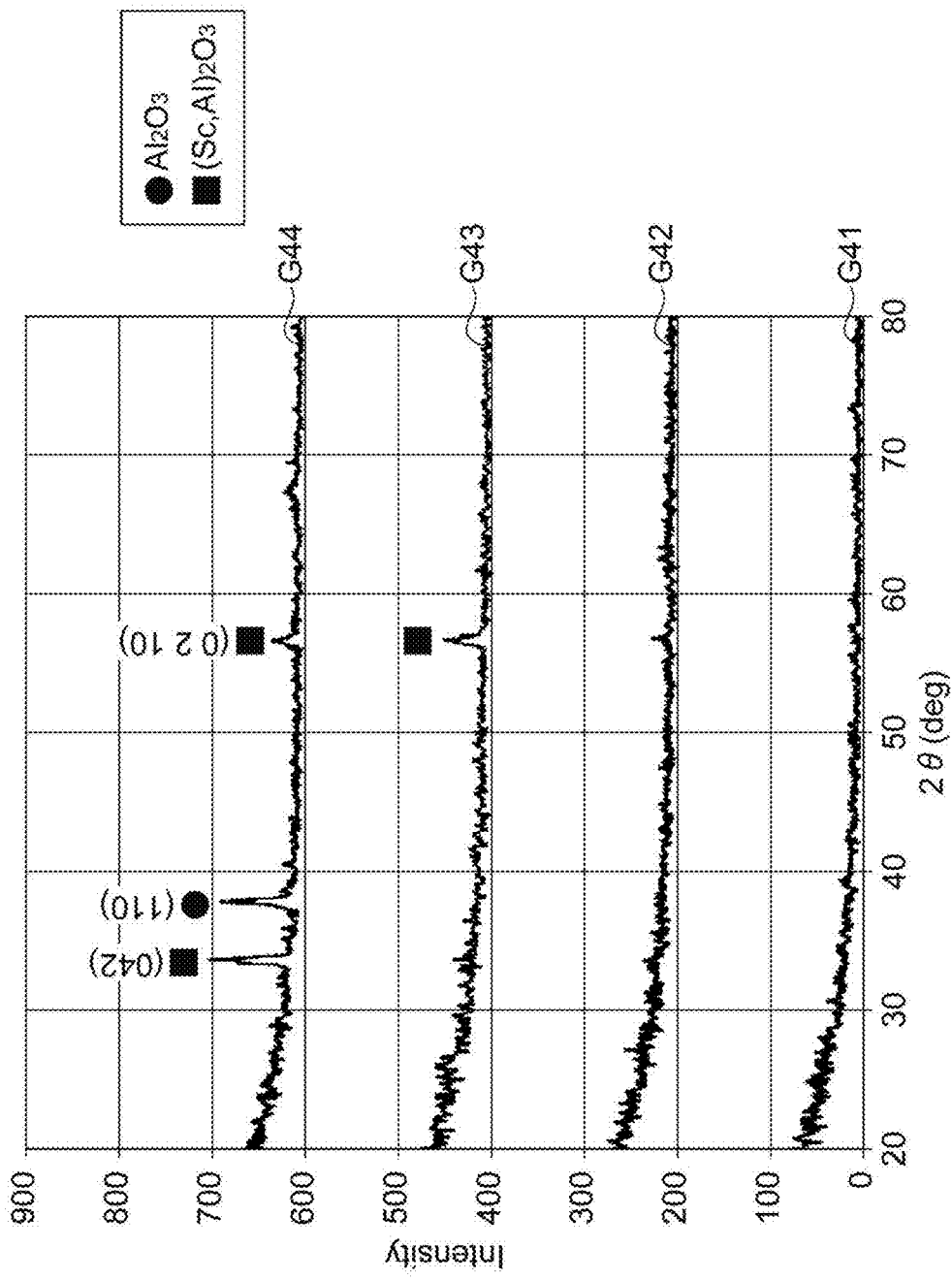

ULTRAVIOLET LIGHT-GENERATING TARGET AND METHOD FOR MANUFACTURING THE SAME, AND ELECTRON BEAM-EXCITED ULTRAVIOLET LIGHT SOURCE

TECHNICAL FIELD

The present invention relates to an ultraviolet light-generating target and a method for manufacturing the same, and an electron beam-excited ultraviolet light source.

BACKGROUND

Conventionally, as an ultraviolet light source that generates ultraviolet light, an electron beam-excited ultraviolet light source is known, and for the ultraviolet light source, for example, $Al_2O_3$ doped with Sc (also described as "Sc:$Al_2O_3$") is used as a light-emitting material.

BinLi et al., "Ultraviolet emission and Fano resonance in doped nano-alumina", JOURNAL OF APPLIED PHYSICS 101, 053534 (2007), studies the relationship between the crystal structure of $Al_2O_3$ in Sc:$Al_2O_3$ and CL (Cathode Luminescence) intensity, and discloses that when firing is performed at high temperature (for example, about 1200° C.), the crystal structure of $Al_2O_3$ changes from the δ phase and the θ phase to the α phase to increase the proportion of the α phase, and thus the CL intensity increases. In other words, the literature discloses that good CL intensity is obtained by the fact that crystalline Sc:$Al_2O_3$ has a predetermined crystal structure (α-$Al_2O_3$). An ultraviolet light-emitting material using Sc:$Al_2O_3$ is also disclosed in Japanese Unexamined Patent Publication No. 2013-245292.

SUMMARY

However, a problem of conventional Sc:$Al_2O_3$ is that the emission wavelength range thereof is not sufficiently wide. In other words, while conventional Sc:$Al_2O_3$ has an emission peak at about 230 to 300 nm (also referred to as the deep ultraviolet region), it hardly emits light at about 200 nm (also referred to as the vacuum ultraviolet region).

Accordingly, it is an object of the present invention to provide an ultraviolet light-generating target that can generate ultraviolet light over a wide wavelength range and a method for manufacturing the same, and an electron beam-excited ultraviolet light source.

The present invention provides, in one aspect, an ultraviolet light-generating target comprising a substrate transmitting ultraviolet light; and a light-emitting layer provided on the substrate and emitting ultraviolet light in response to an electron beam, wherein the light-emitting layer is an amorphous layer formed of $Al_2O_3$ doped with Sc.

A thickness of the light-emitting layer may be 2.0 μm or less.

A doping concentration of the Sc in the light-emitting layer may be 4.0 atomic % or less.

The present invention provides, in another aspect, an electron beam-excited ultraviolet light source comprising the above ultraviolet light-generating target; and an electron source providing the electron beam to the ultraviolet light-generating target.

The present invention provides, in still another aspect, a method for manufacturing an ultraviolet light-generating target, comprising vapor-depositing $Al_2O_3$ doped with Sc on a substrate transmitting ultraviolet light, to form an amorphous layer; and firing the amorphous layer.

A thickness of the amorphous layer may be set at 2.0 μm or less.

A doping concentration of the Sc in the amorphous layer may be set at 4.0 atomic % or less.

According to the present invention, ultraviolet light can be generated over a wide wavelength range.

BRIEF DESCRIPTION OF THE DRAWINGS

FIG. 6 is a graph showing the XRD patterns of the light-emitting layers of Examples 8, 12, 16, and 20;

DETAILED DESCRIPTION

Embodiments of the present invention will be described in detail below with reference to the drawings.

Figure 1:
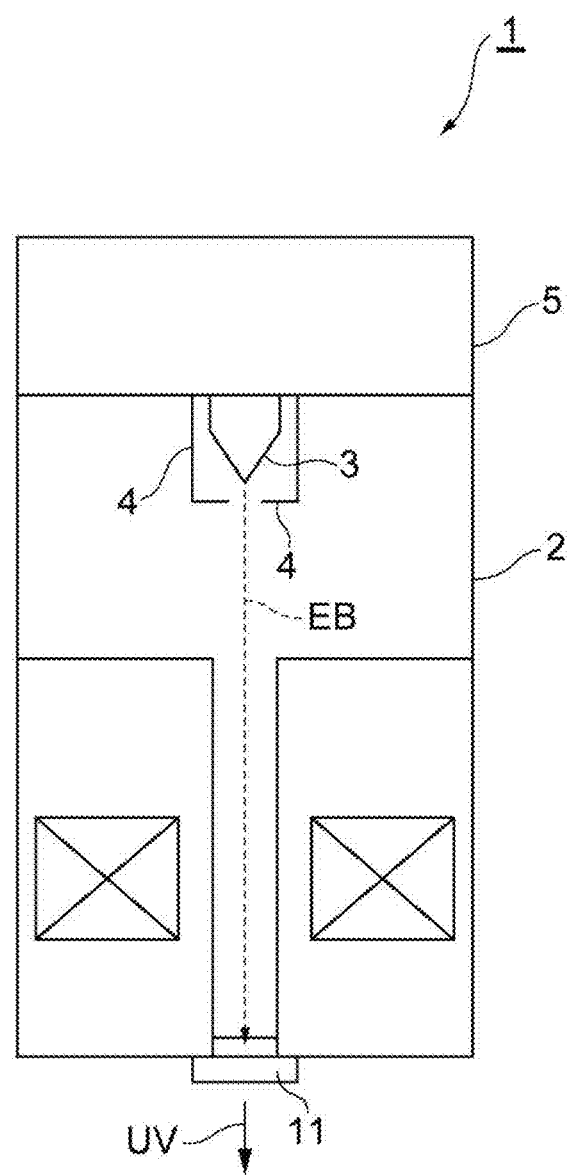
FIG. 1 is a schematic diagram showing the internal configuration of an electron beam-excited ultraviolet light source.

FIG. 1 is a schematic diagram showing the internal configuration of an electron beam-excited ultraviolet light source according to one embodiment. As shown in FIG. 1, an electron beam-excited ultraviolet light source 1 comprises an evacuated glass container (electron tube) 2, an electron source 3 and an extraction electrode 4 disposed on the upper end side inside the container 2, and an ultraviolet light-generating target 11 disposed on the lower end side inside the container 2.

A power supply portion 5 is electrically connected to the electron source 3 and the extraction electrode 4, and when an appropriate extraction voltage is applied between the electron source 3 and the extraction electrode 4 from the power supply portion 5, an electron beam EB accelerated by the high voltage is emitted from the electron source 3. The electron source 3 may be, for example, an electron source that emits a large area electron beam (for example, a cold cathode of carbon nanotubes or the like, or a hot cathode).

The ultraviolet light-generating target 11 is set, for example, at ground potential, and a negative high voltage is applied to the electron source 3 from the power supply portion 5. The ultraviolet light-generating target 11 is irradiated with the electron beam EB thus emitted from the electron source 3. The ultraviolet light-generating target 11 is excited in response to this electron beam EB and generates ultraviolet light UV.

Figure 2:
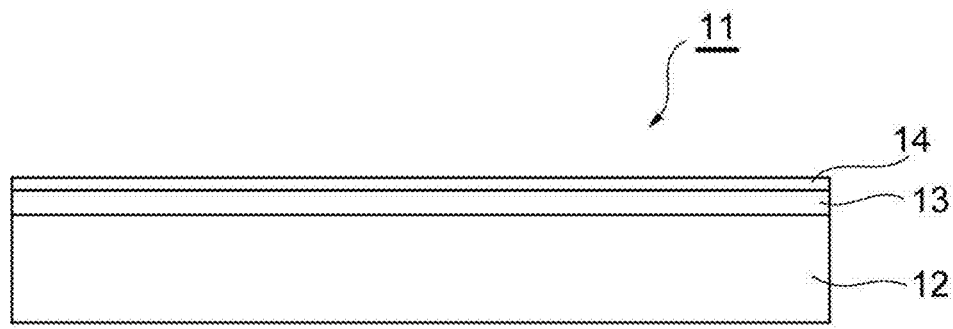
FIG. 2 is a side view showing the configuration of an ultraviolet light-generating target.

FIG. 2 is a side view showing the configuration of the ultraviolet light-generating target 11. As shown in FIG. 2, the ultraviolet light-generating target 11 comprises a substrate 12, a light-emitting layer 13 provided on the substrate 12, and an ultraviolet light-reflecting layer (for example, an aluminum layer) 14 having electrical conductivity provided on the light-emitting layer 13. The substrate 12 is a plate-like member consisting of a material that transmits ultraviolet light, for example, sapphire ($Al_2O_3$), quartz ($SiO_2$), or rock crystal (crystal of silicon oxide). The thickness of the substrate 12 may be, for example, 0.1 to 10 mm. The thickness of the ultraviolet light-reflecting layer 14 may be, for example, about 50 nm.

The light-emitting layer 13 is excited in response to the electron beam EB shown in FIG. 1 and generates ultraviolet light UV. The light-emitting layer 13 is an amorphous layer formed of $Al_2O_3$ doped with Sc ($Sc:Al_2O_3$). The amorphous layer here encompasses, in addition to a layer having no orientation (crystallinity) at all, a layer having orientation (crystallinity) in part thereof and is defined as a layer which shows an intensity of the diffraction plane from $Al_2O_3$ of 200 cps (count per second) or less, and an intensities of the (042) and (0210) planes from $(Sc,Al)_2O_3$ of 200 cps or less in In-plane X-ray diffraction (XRD) measurement using $CuK\alpha$ rays at 45 kV and 200 mA.

The light-emitting layer 13 preferably contains substantially no α-phase $Al_2O_3$ ($\alpha$-$Al_2O_3$). Here, containing substantially no α-phase $Al_2O_3$ means that in a diffraction pattern measured by an In-plane X-ray diffraction (XRD) method, the intensity of the peak from α-phase $Al_2O_3$ is 200 cps or less.

The doping concentration of Sc in $Sc:Al_2O_3$ forming the light-emitting layer 13 may be 0.1 atomic % or more, and is preferably 0.3 atomic % or more, more preferably 0.5 atomic % or more, further preferably 0.7 atomic % or more, and particularly preferably 0.8 atomic % or more in view of excellent ultraviolet light emission intensity. The doping concentration may be 5.0 atomic % or less, and is preferably 4.0 atomic % or less, more preferably 3.0 atomic % or less, further preferably 2.0 atomic % or less, and particularly preferably 1.5 atomic % or less in view of the excellent layer-forming properties and ultraviolet light emission intensity of the light-emitting layer 13.

The thickness of the light-emitting layer 13 may be 2.0 μm or less, and is preferably 1.8 μm or less, more preferably 1.6 μm or less, further preferably 1.4 μm or less, and particularly preferably 1.2 μm or less in view of obtaining a preferred amorphous layer and excellent ultraviolet light emission intensity. The thickness of the light-emitting layer 13 may be 0.05 μm or more, and is preferably 0.1 μm or more, more preferably 0.5 μm or more, further preferably 0.8 μm or more, and particularly preferably 1.0 μm or more in view of excellent ultraviolet light emission intensity.

The light-emitting layer 13 having the configuration as described above emits ultraviolet light by being excited by an electron beam. The ultraviolet light emitted from the light-emitting layer 13 has an emission peak in a deep ultraviolet region of 230 to 250 nm in one embodiment. On the other hand, light in a vacuum ultraviolet region of about 200 nm is also emitted from the light-emitting layer 13. The present inventors presume that ultraviolet light is generated over such a wide wavelength range due to the fact that the light-emitting layer 13 is an amorphous layer.

Figure 3:
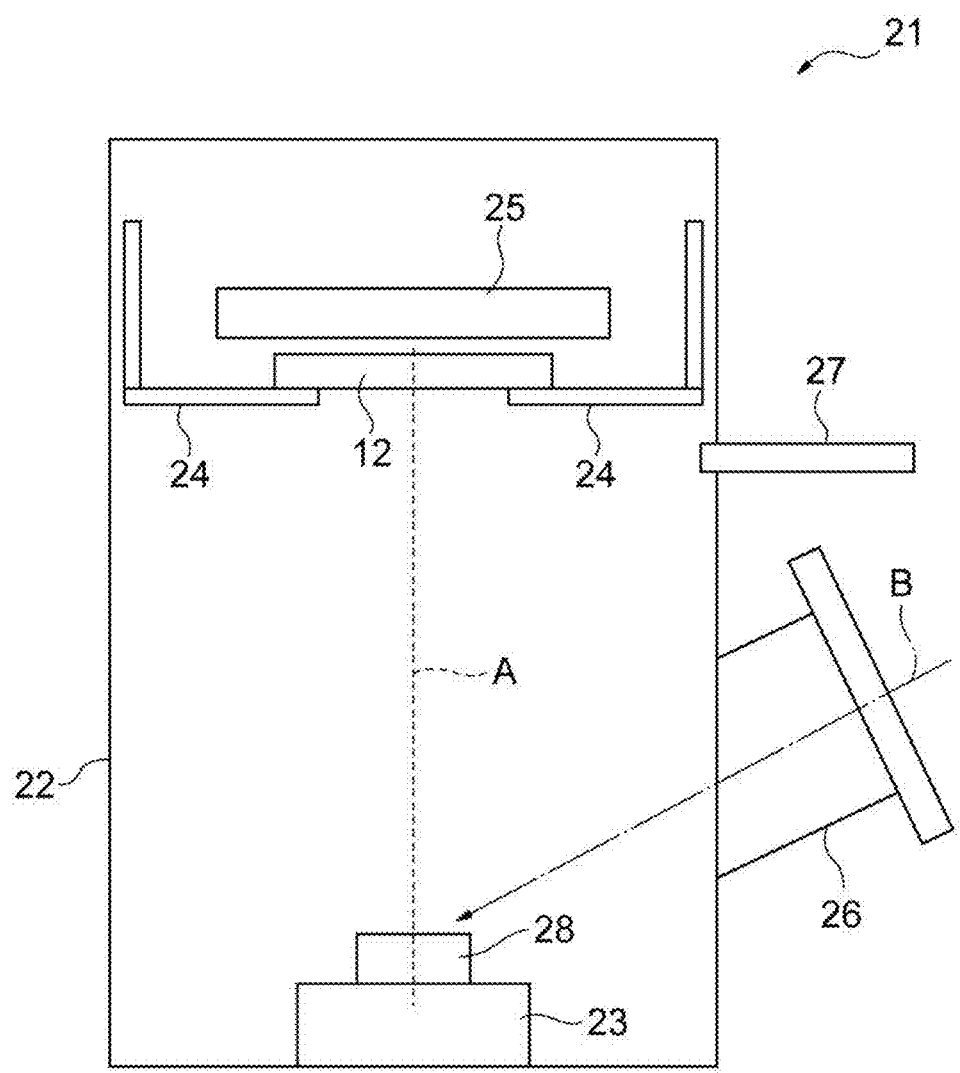
FIG. 3 is a schematic diagram showing the configuration of a laser ablation apparatus.

Next, a method for manufacturing the ultraviolet light-generating target 11 will be described. FIG. 3 is a schematic diagram showing the configuration of a laser ablation apparatus 21 used in this manufacturing method. As shown in FIG. 3, the laser ablation apparatus 21 comprises a vacuum container 22, a sample placement stage 23 disposed on the bottom surface of the vacuum container 22, a rotating holder 24 disposed in the upper portion of the vacuum container 22 (above the sample placement stage 23), a heater 25 disposed further above the rotating holder 24, a laser introduction port 26 that externally introduces a laser beam B, and a gas introduction port 27 that externally introduces a gas such as oxygen gas.

A raw material 28 is placed on the sample placement stage 23. The rotating holder 24 supports the substrate 12 disposed above the raw material 28. Specifically, the rotating holder 24 holds the substrate 12 in such a way as to be rotatable around an axis A connecting the raw material 28 and the substrate 12, with one surface of the substrate 12 exposed opposite to the raw material 28.

In this manufacturing method, first, $Sc:Al_2O_3$ is vapor-deposited on the substrate 12 to form an amorphous layer (first step). Specifically, first, as the raw material 28, a ceramic target of $Al_2O_3$ doped with a predetermined concentration of Sc is made. Next, the substrate 12 is provided and mounted on the rotating holder 24 of the laser ablation apparatus 21, and the raw material 28 made is placed on the sample placement stage 23. Then, the inside of the vacuum container 22 is evacuated, and the substrate 12 is heated to a predetermined temperature (for example, 800° C.) by the heater 25. Then, while oxygen gas is supplied to the inside of the vacuum container 22 from the gas introduction port 27, the laser beam (for example, a laser beam from a KrF excimer laser (wavelength 248 nm)) B is introduced from the laser introduction port 26 to irradiate the raw material 28 with the laser beam B. Thus, the raw material 28 evaporates in response to the laser beam B and scatters inside the vacuum container 22. Some of this scattering raw material 28 adheres to one exposed surface of the substrate 12, and an amorphous layer of $Sc:Al_2O_3$ is formed (ablation layer formation).

The time during which $Sc:Al_2O_3$ is vapor-deposited in the first step is appropriately adjusted so that the amorphous layer reaches the desired thickness. The thickness of the amorphous layer may be set at 2.0 μm or less, and is preferably set at 1.8 μm or less, more preferably 1.6 μm or less, further preferably 1.4 μm or less, and particularly preferably 1.2 μm or less in view of obtaining preferred amorphous layer and the excellent ultraviolet light emission intensity of the light-emitting layer 13. The thickness of the amorphous may be set at 0.05 μm or more, and is preferably set at 0.1 μm or more, more preferably 0.5 μm or more, further preferably 0.8 μm or more, and particularly preferably 1.0 μm or more in view of the excellent ultraviolet light emission intensity of the light-emitting layer 13.

Next, the amorphous layer of Sc:$Al_2O_3$ formed on one surface of the substrate 12 is fired (second step). Specifically, the substrate 12 on which the amorphous layer is formed is removed from the laser ablation apparatus 21 and placed into a firing apparatus. Then, by setting the temperature in the firing apparatus, for example, at a temperature higher than 1000° C., and maintaining the temperature for a predetermined time, the amorphous layer on the substrate 12 is fired (annealed). Thus, the light-emitting layer 13 is formed on one surface of the substrate 12.

The firing atmosphere in the second step may be, for example, a vacuum or the air. The firing temperature in the second step may be, for example, 1800° C. or less, and is preferably 1700° C. or less, more preferably 1600° C. or less, further preferably 1500° C. or less, and particularly preferably 1400° C. or less in view of the excellent layer-forming properties and ultraviolet light emission intensity of the light-emitting layer 13. The firing temperature in the second step may be, for example, 1200° C. or more. The firing time in the second step may be, for example, 1 to 5 hours.

Next, the ultraviolet light-reflecting layer 14 is formed on the light-emitting layer 13, for example, by vapor deposition (third step). The method for vapor-depositing the ultraviolet light-reflecting layer 14 may be a known method. The ultraviolet light-generating target 11 as shown in FIG. 2 is obtained by the above first to third steps.

EXAMPLES

The present invention will be more specifically described below based on Examples, but the present invention is not limited to the following Examples.

Examples 1 to 6

In Examples 1 to 6, as a raw material 28, a ceramic target of $Al_2O_3$ doped with 2.0 atomic % of Sc was made. This ceramic target was placed on the sample placement stage 23 of a laser ablation apparatus 21, and a substrate (sapphire substrate) 12 having a diameter of 2 in. was mounted on a rotating holder 24. The distance between the ceramic target and the sapphire substrate was 150 mm. Then, the inside of a vacuum container 22 was evacuated, and the sapphire substrate was heated to 500° C. Then, while oxygen gas was supplied to the inside of the vacuum container 22, the ceramic target was irradiated with a laser beam B to form an amorphous layer of Sc:$Al_2O_3$ on the sapphire substrate. At this time, a KrF excimer laser (150 mJ, 40 Hz) was used as the laser light source of the laser beam B. The laser beam B irradiation time in Examples 1 to 6 was set as shown in Table 1.

Figure 4A:
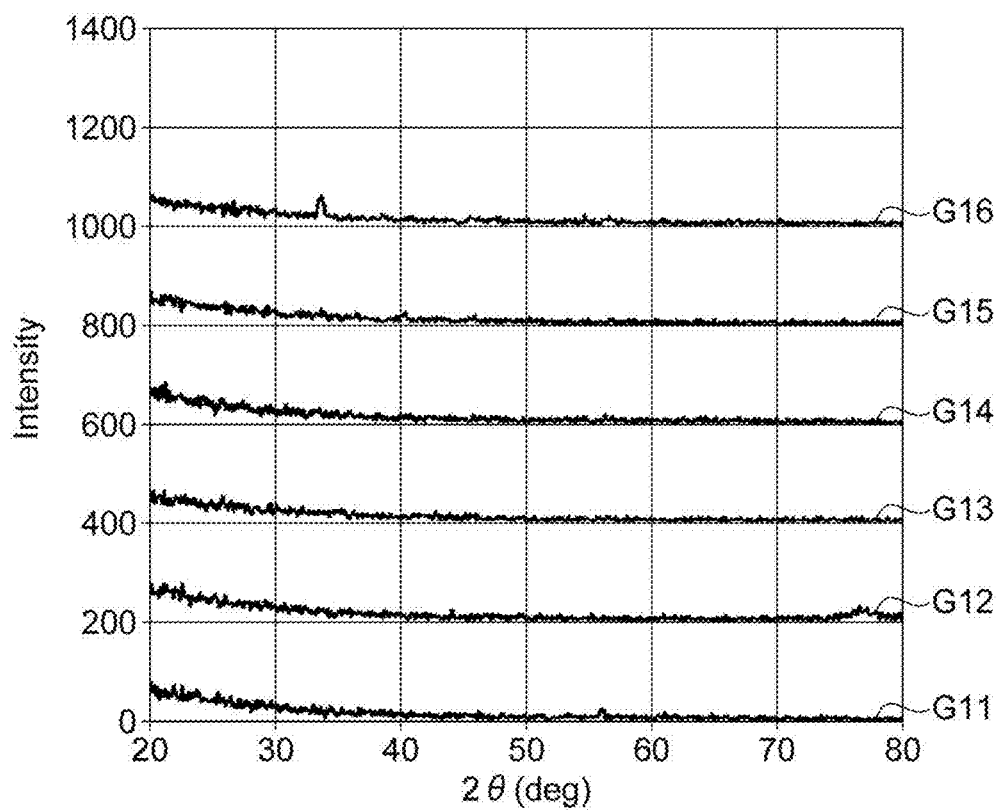
FIG. 4A is a graph showing the XRD patterns of the light-emitting layers of Examples 1 to 6.

Then, the sapphire substrate on which the amorphous layer was formed was placed into a firing apparatus and heated in a vacuum ($10^{-2}$ Pa) at 1500° C. for 2 hours to obtain a light-emitting layer on the sapphire substrate. For the light-emitting layer of each of ultraviolet light-generating targets obtained in Examples 1 to 6, In-plane X-ray diffraction (XRD) measurement was performed. The results are shown in FIG. 4A. It is seen that for all of Examples 1 to 6, the light-emitting layer is an amorphous layer.

Figure 4B:
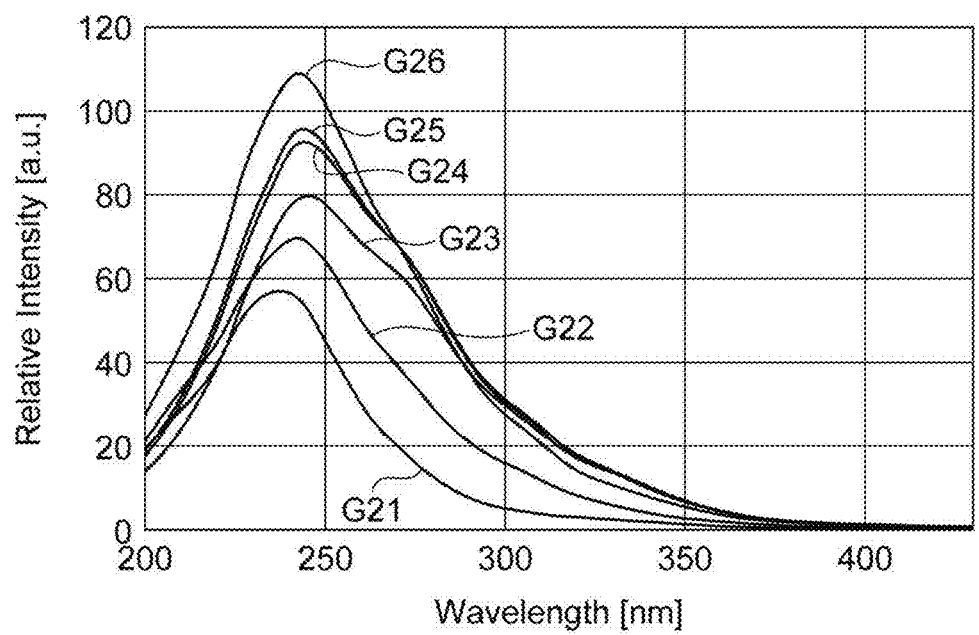
FIG. 4B is a graph showing the emission spectra of the light-emitting layers of Examples 1 to 6.

A 50 nm aluminum layer was formed on the light-emitting layer to make an ultraviolet light-generating target. Each of the ultraviolet light-generating targets obtained in Examples 1 to 6 was irradiated with an electron beam with acceleration voltage: 10 kV, amount of current: 200 μA, and diameter: 2 mm, and the emission spectrum and the emission intensity at this time were measured. The emission spectrum measurement results are shown in FIG. 4B. The emission intensity measurement results are shown in Table 1.

TABLE 1

| | Laser beam irradiation time (min) | Thickness of light-emitting layer (nm) | Emission intensity (mW) | XRD pattern (FIG. 4A) | Emission spectrum (FIG. 4B) |
|---|---|---|---|---|---|
| Example 1 | 5 | 98 | 7.8 | G11 | G21 |
| Example 2 | 15 | 237 | 10.0 | G12 | G22 |
| Example 3 | 30 | 460 | 13.2 | G13 | G23 |
| Example 4 | 45 | 742 | 14.5 | G14 | G24 |
| Example 5 | 60 | 863 | 14.8 | G15 | G25 |
| Example 6 | 90 | 1663 | 16.0 | G16 | G26 |

Examples 7 to 22

Figure 5:
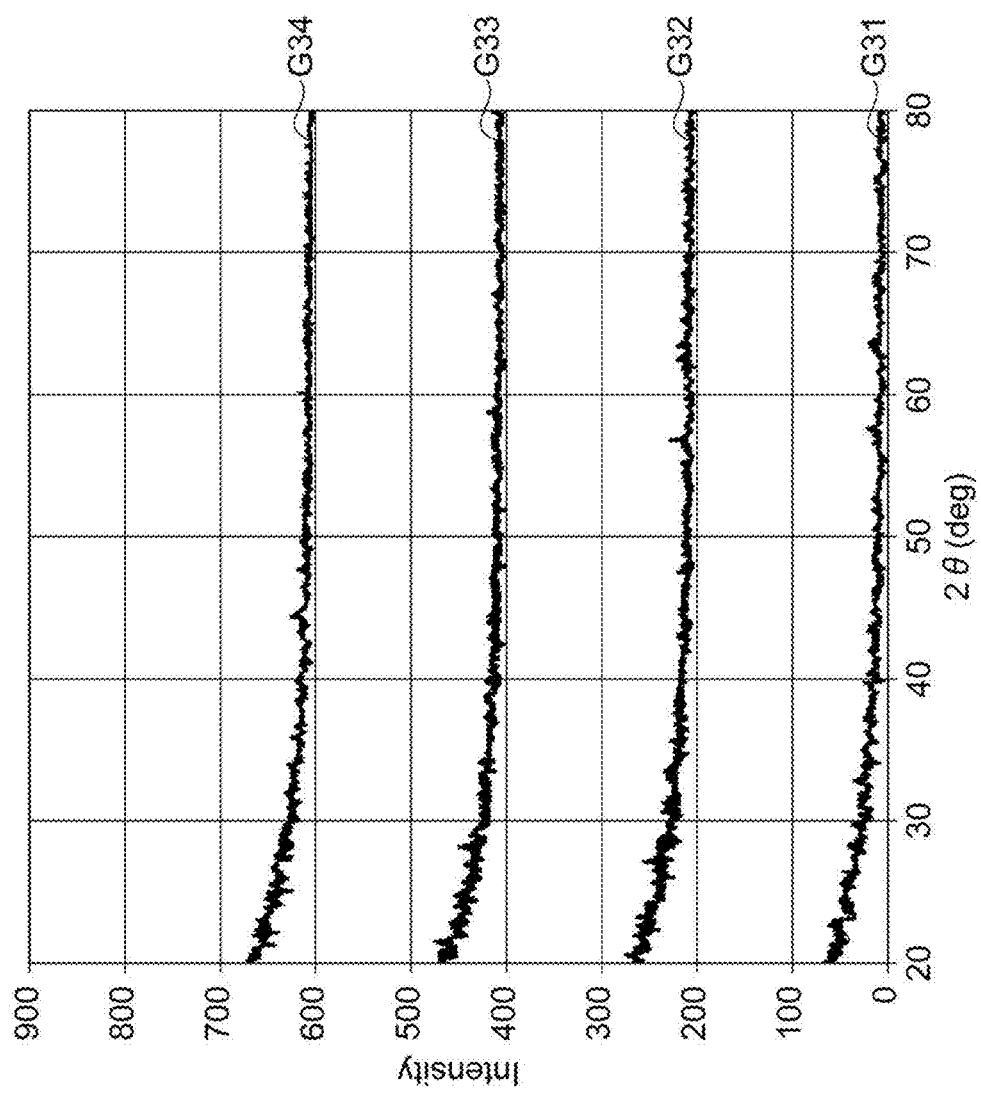
FIG. 5 is a graph showing the XRD patterns of the light-emitting layers of Examples 11 to 13.
Figure 7A:
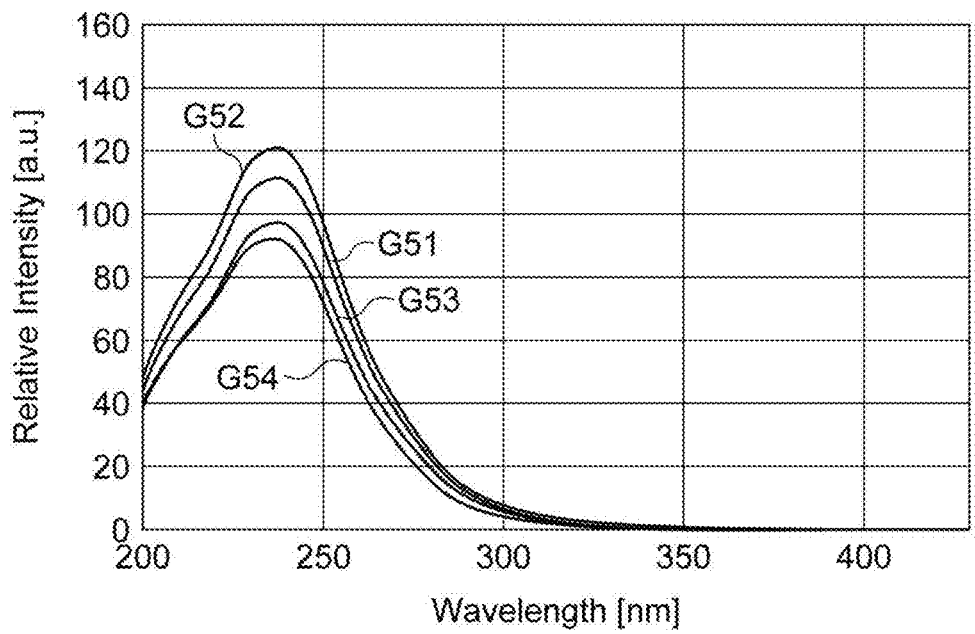
FIG. 7A is a graph showing the emission spectra of the light-emitting layers of Examples 7 to 10.
Figure 7B:
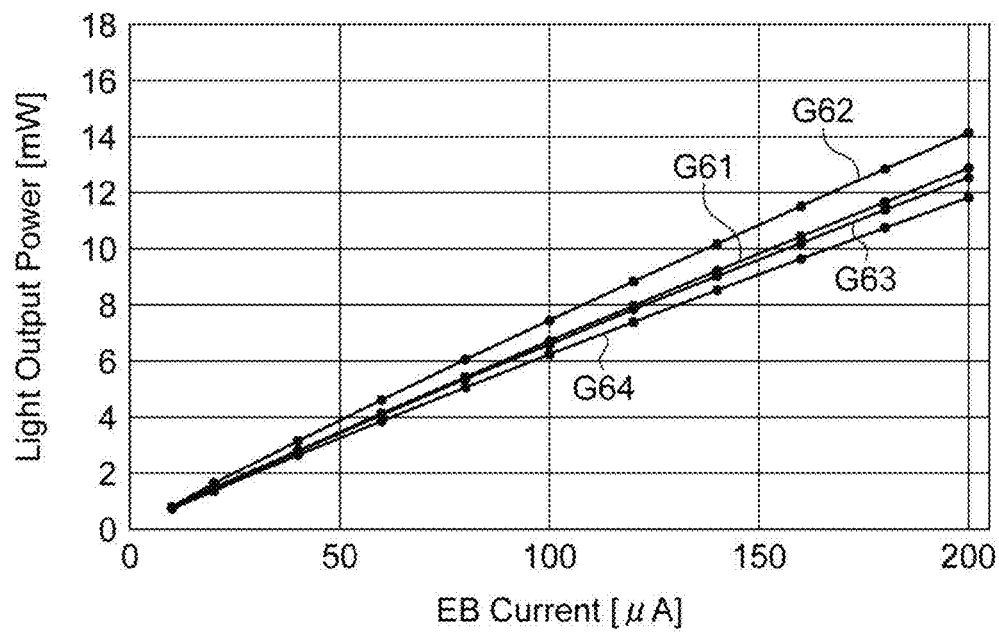
FIG. 7B is a graph showing the emission intensities of the light-emitting layers of Examples 7 to 10.
Figure 8A:
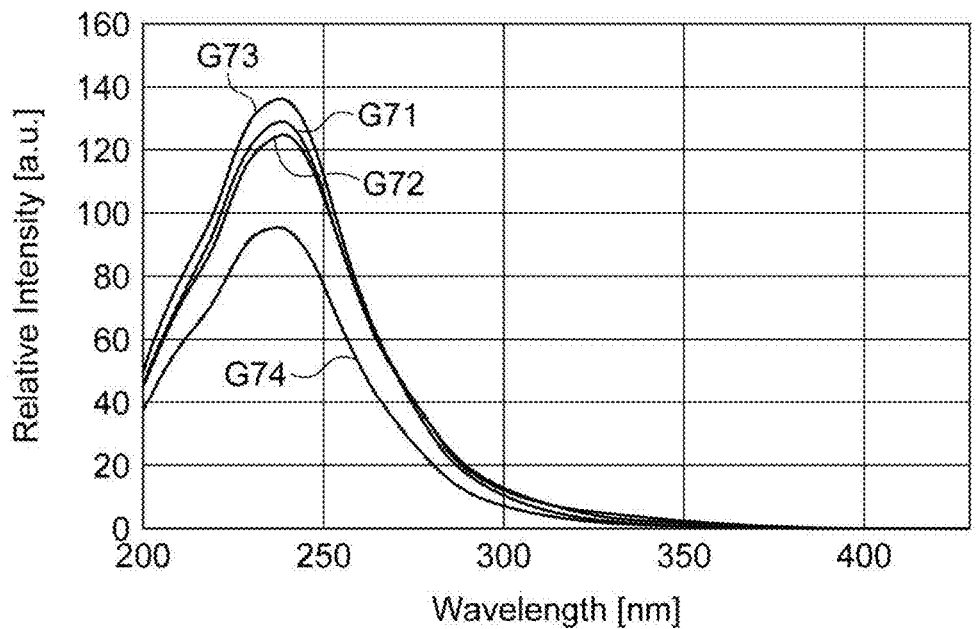
FIG. 8A is a graph showing the emission spectra of the light-emitting layers of Examples 11 to 14.
Figure 8B:
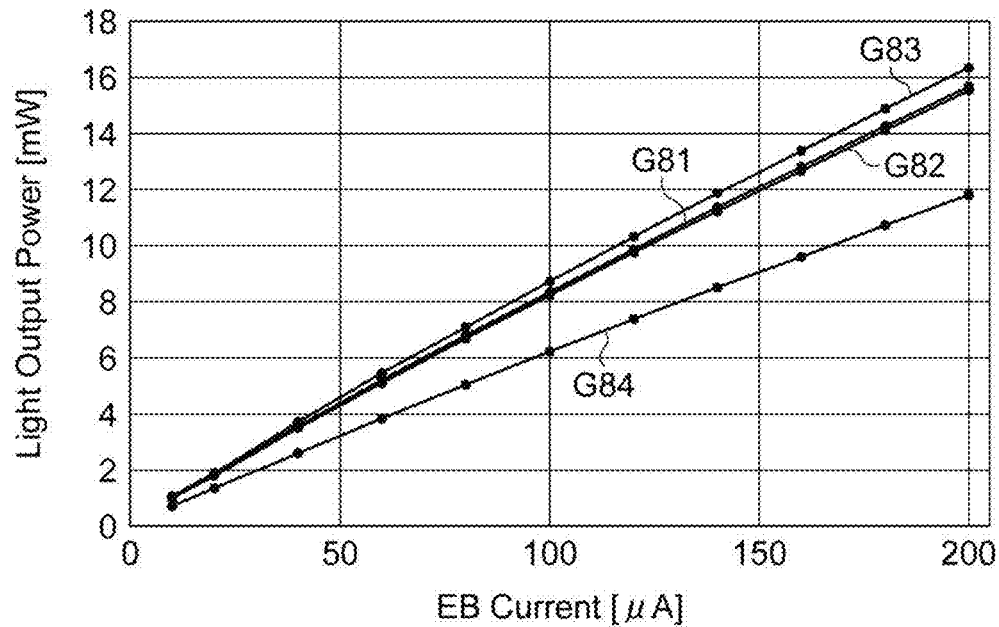
FIG. 8B is a graph showing the emission intensities of the light-emitting layers of Examples 11 to 14.
Figure 9A:
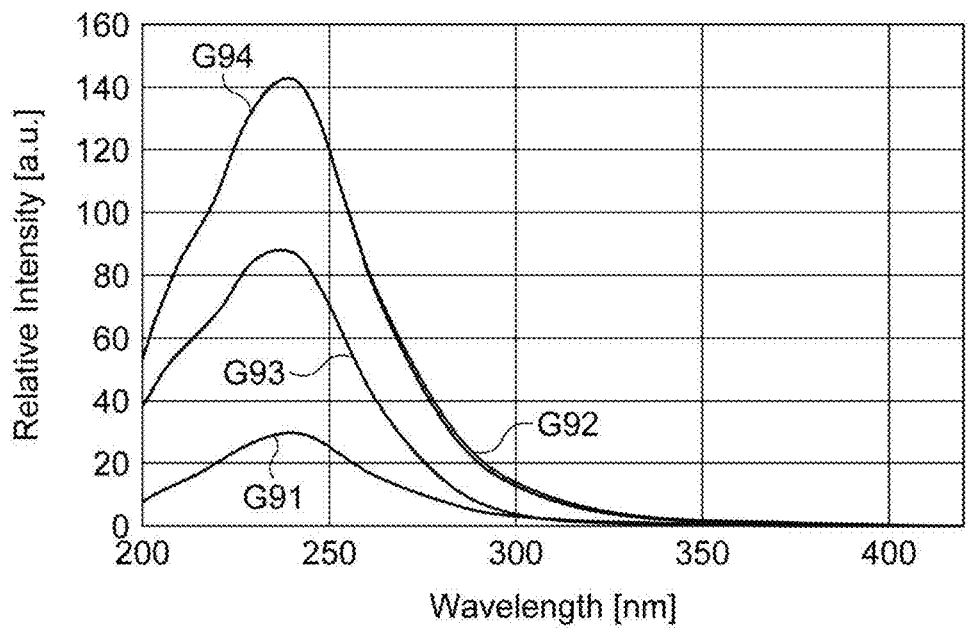
FIG. 9A is a graph showing the emission spectra of the light-emitting layers of Examples 15 to 18.
Figure 9B:
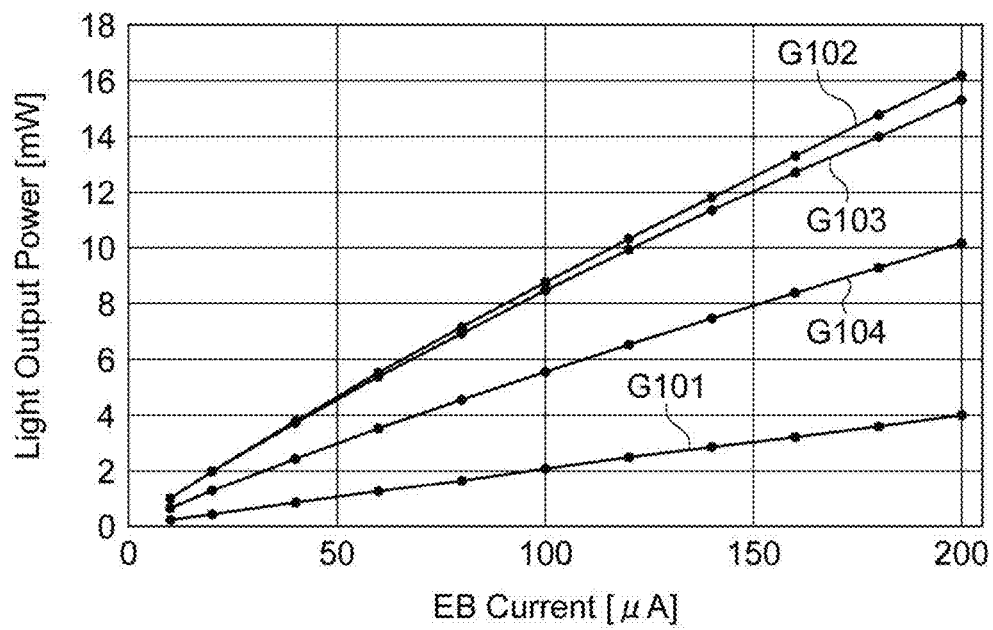
FIG. 9B is a graph showing the emission intensities of the light-emitting layers of Examples 15 to 18.
Figure 10A:
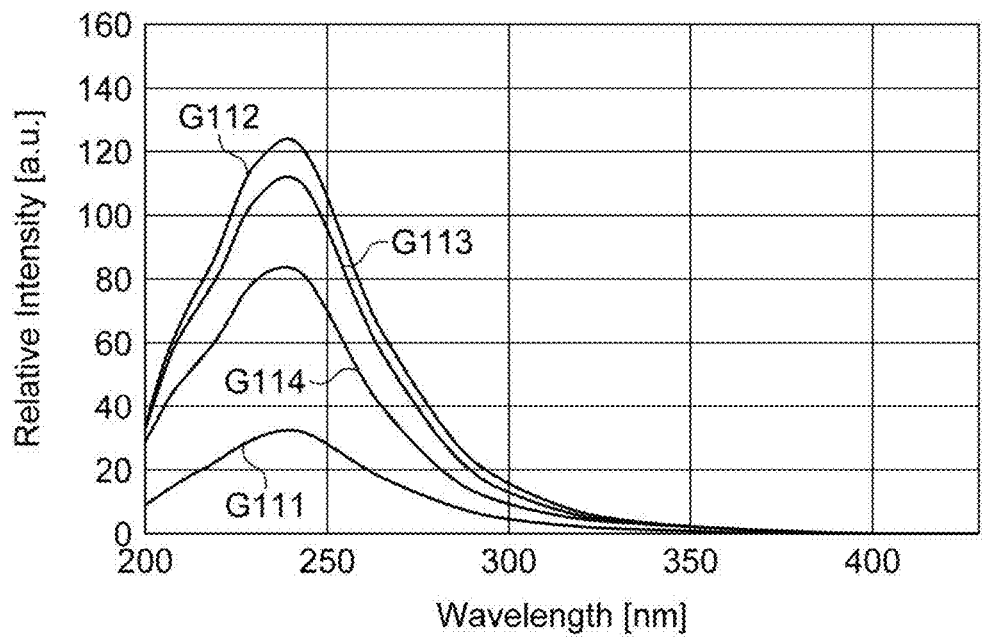
FIG. 10A is a graph showing the emission spectra of the light-emitting layers of Examples 19 to 22.
Figure 10B:
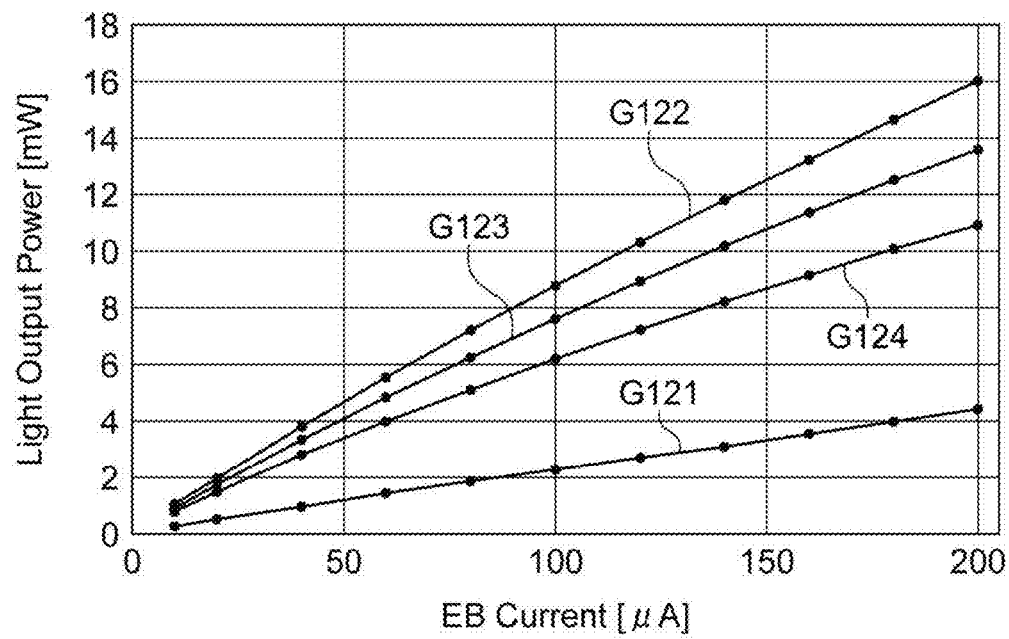
FIG. 10B is a graph showing the emission intensities of the light-emitting layers of Examples 19 to 22.
Figure 11B:
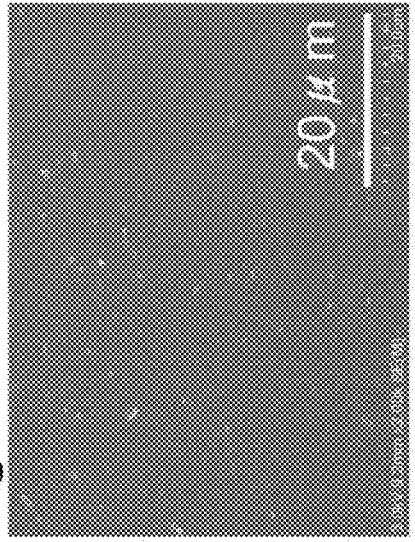
FIGS. 11A, B, C, and D are respectively photographs in which the surfaces of the ultraviolet light-generating targets of Examples 8, 12, 16, and 20 on the aluminum layer sides are observed by an FE-SEM.
Figure 11D:
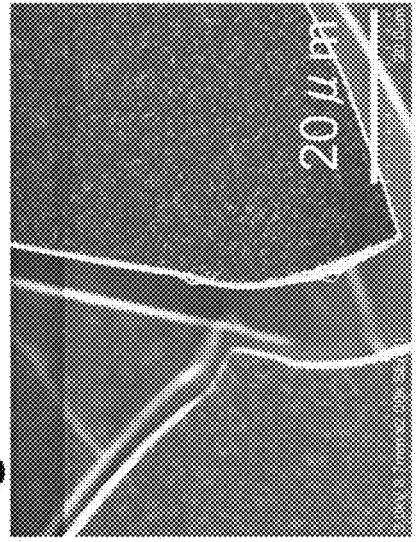
Figure 11A:
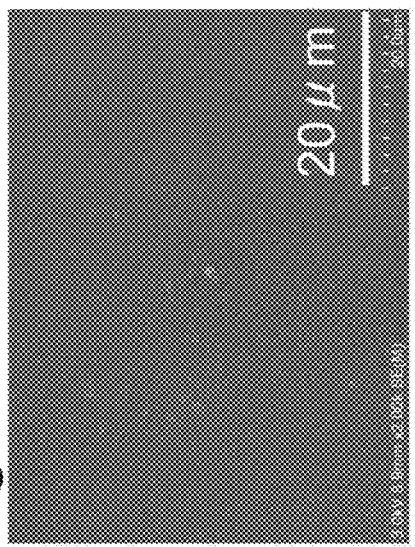
Figure 11C:
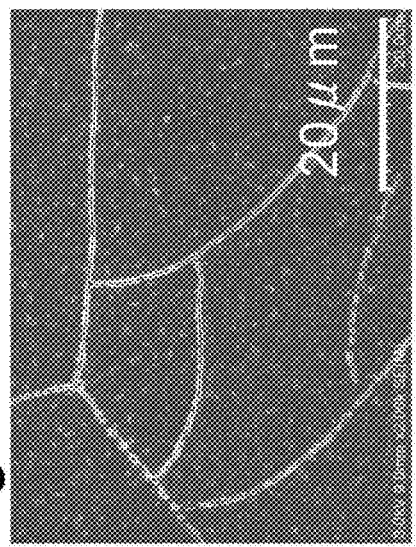

The making and evaluation of a light-emitting layer and an ultraviolet light-generating target were performed as in Example 6 except that the doping concentration of Sc in the ceramic target that was the raw material 28 and the firing temperature were changed as shown in Table 2. The measurement results of In-plane X-ray diffraction (XRD) measurement in Examples 8, 11 to 14, 16, and 20 are shown in FIGS. 5 and 6, the emission spectrum measurement results in Examples 7 to 22 are shown in FIGS. 7A, 8A, 9A, and 10A, and the emission intensity measurement results in Examples 7 to 22 are shown in FIGS. 7B, 8B, 9B, and 10B. For Examples 8, 12, 16, and 20, the surfaces of the ultraviolet light-generating targets on the aluminum layer sides were observed by an FE-SEM. Their photographs are shown in FIG. 11A (Example 8), FIG. 11B (Example 12), FIG. 11C (Example 16), and FIG. 11D (Example 20) respectively.

TABLE 2

| | Doping concentration of Sc (atomic %) | Firing temperature (° C.) | XRD pattern (FIGS. 5 and 6) | Emission spectrum (FIGS. 7A, 8A, 9A, and 10A) | Emission intensity (FIGS. 7B, 8B, 9B, and 10B) |
|---|---|---|---|---|---|
| Example 7 | 0.5 | 1500 | — | G51 | G61 |
| Example 8 | 0.5 | 1600 | G41 | G52 | G62 |
| Example 9 | 0.5 | 1700 | — | G53 | G63 |
| Example 10 | 0.5 | 1800 | — | G54 | G64 |
| Example 11 | 1.0 | 1500 | G31 | G71 | G81 |
| Example 12 | 1.0 | 1600 | G32, G42 | G72 | G82 |
| Example 13 | 1.0 | 1700 | G33 | G73 | G83 |
| Example 14 | 1.0 | 1800 | G34 | G74 | G84 |
| Example 15 | 2.0 | 1500 | — | G91 | G101 |
| Example 16 | 2.0 | 1600 | G43 | G92 | G102 |
| Example 17 | 2.0 | 1700 | — | G93 | G103 |
| Example 18 | 2.0 | 1800 | — | G94 | G104 |
| Example 19 | 4.0 | 1500 | — | G111 | G121 |
| Example 20 | 4.0 | 1600 | G44 | G112 | G122 |
| Example 21 | 4.0 | 1700 | — | G113 | G123 |
| Example 22 | 4.0 | 1800 | — | G114 | G124 |

For Example 16 (G43) and Example 20 (G44), the orientation of $Al_2O_3$ (● in FIG. 6) and the orientation of $(Sc,Al)_2O_3$ (■ in FIG. 6) were observed. The peak intensity from the orientation of $(Sc,Al)_2O_3$ in Example 16 (G43) was 53 cps. The peak intensity from the orientation of $Al_2O_3$ in Example 20 (G44) was 92 cps, and the peak intensity from the orientation of $(Sc,Al)_2O_3$ was 103 cps at around 33.6° ((042) plane) and 37 cps at around 56.4° ((0210) plane).

From FIGS. 7A, 8A, 9A, and 10A, it is seen that for all of Examples 7 to 22, it is seen that ultraviolet light can be generated over a wide wavelength range. From FIGS. 7B, 8B, 9B, and 10B, it is seen that among these Examples, the emission intensity is maximum when the doping concentration of Sc is 1.0 atomic %.

Examples 23 to 38

Figure 12:
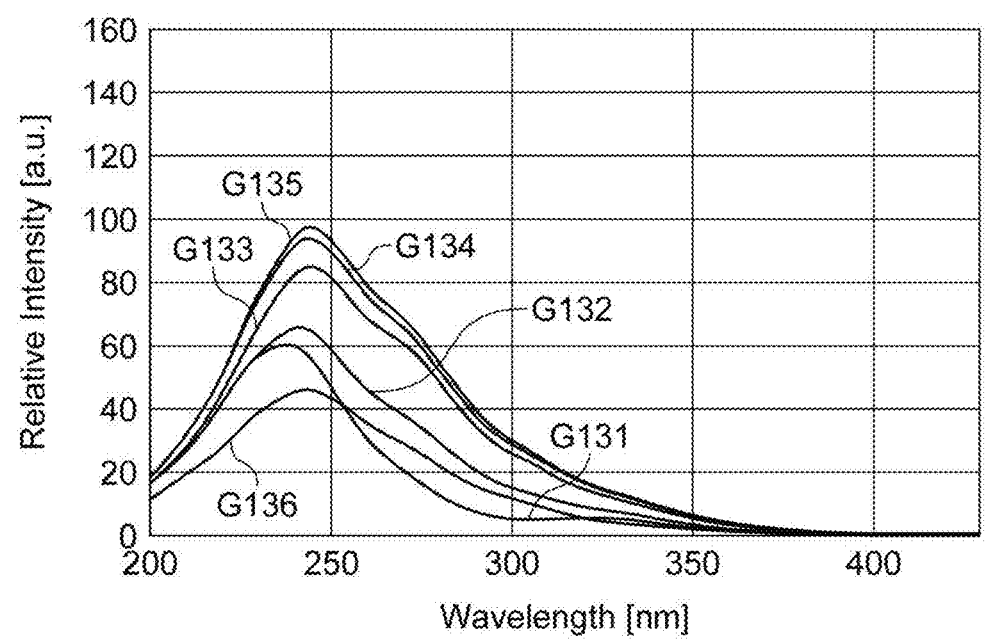
FIG. 12 is a graph showing the emission spectra of the light-emitting layers of Examples 23 to 28.
Figure 13A:
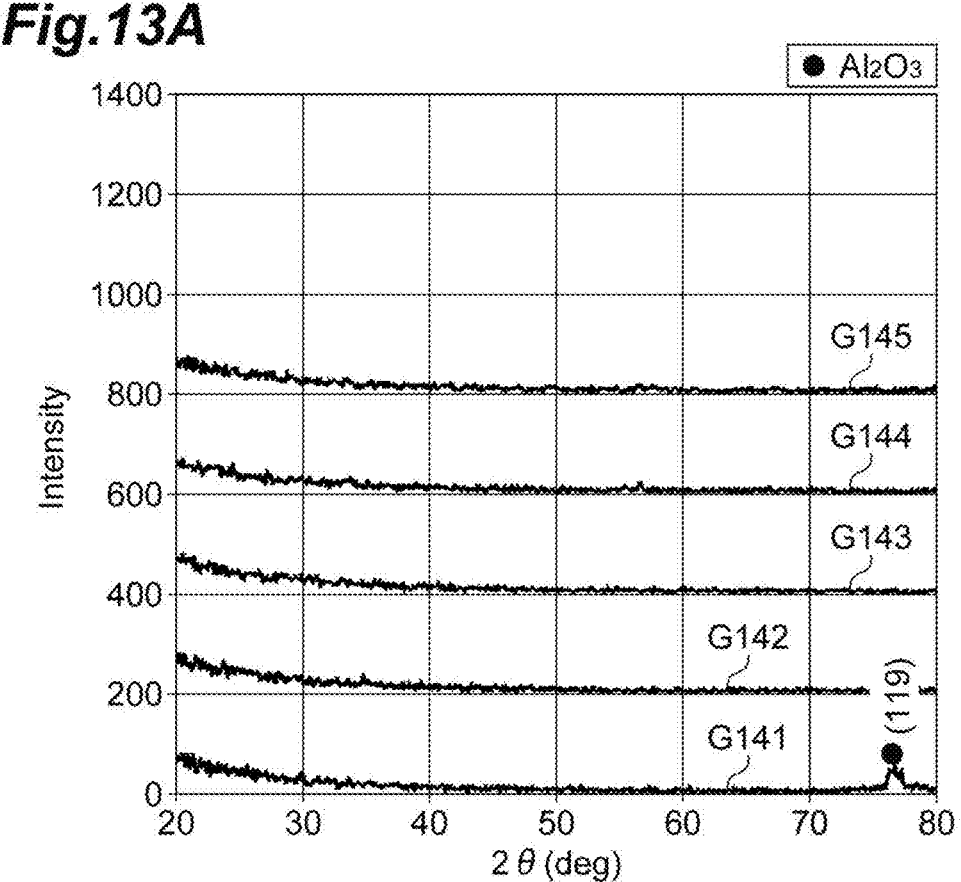
FIG. 13A is a graph showing the XRD patterns of the light-emitting layers of Examples 29 to 33.
Figure 13B:
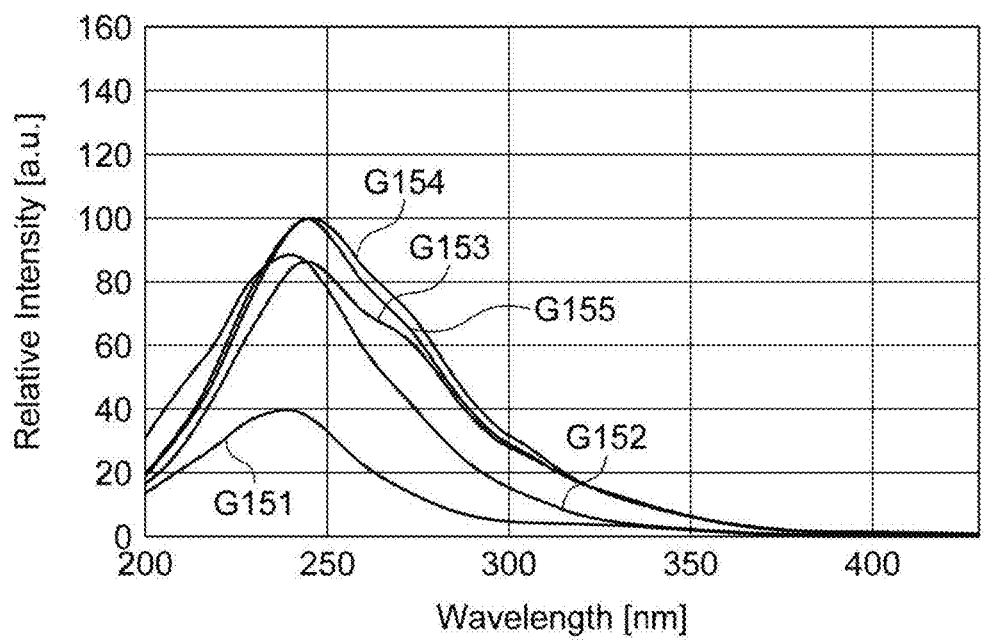
FIG. 13B is a graph showing the emission spectra of the light-emitting layers of Examples 29 to 33.
Figure 14A:
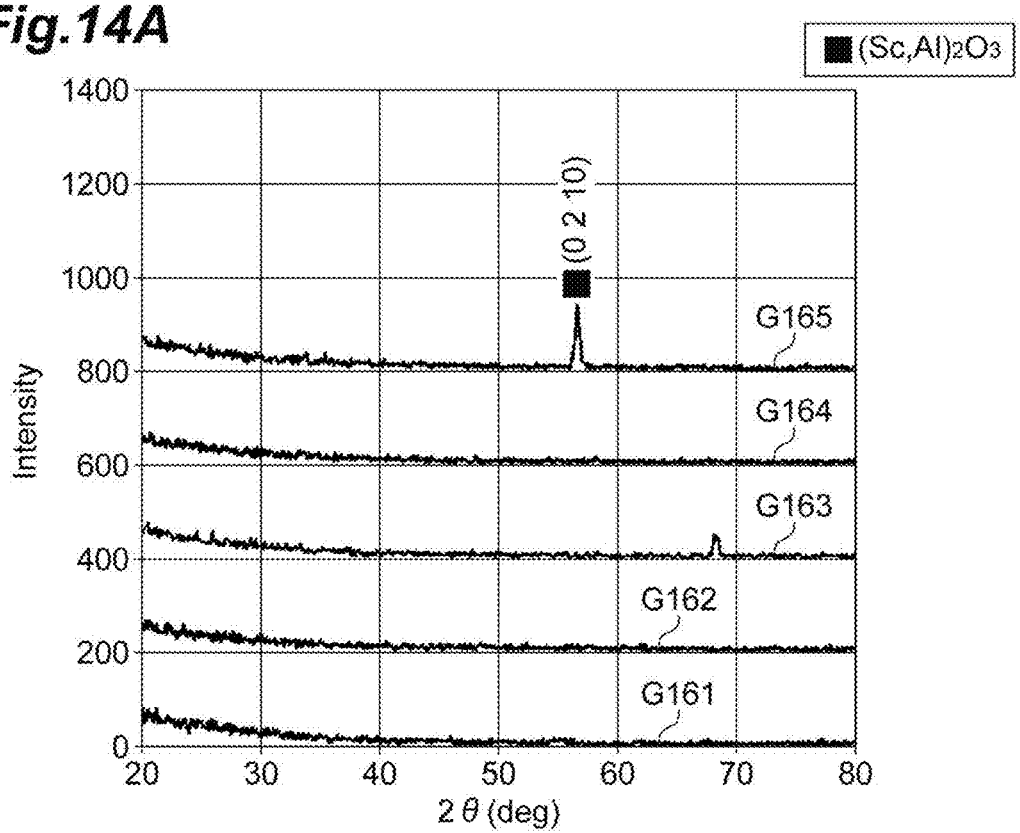
FIG. 14A is a graph showing the XRD patterns of the light-emitting layers of Examples 34 to 38.
Figure 14B:
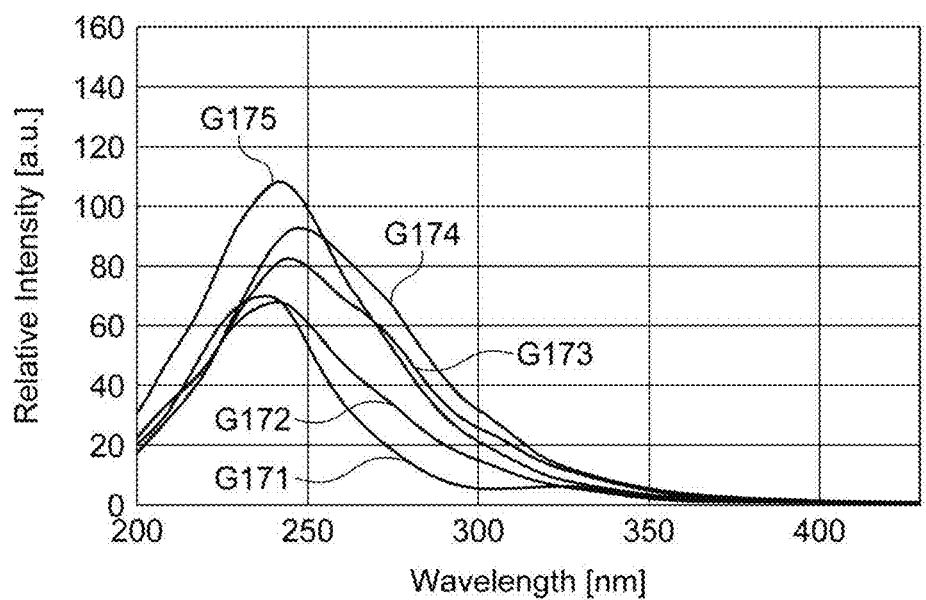
FIG. 14B is a graph showing the emission spectra of the light-emitting layers of Examples 34 to 38.
Figure 15A:
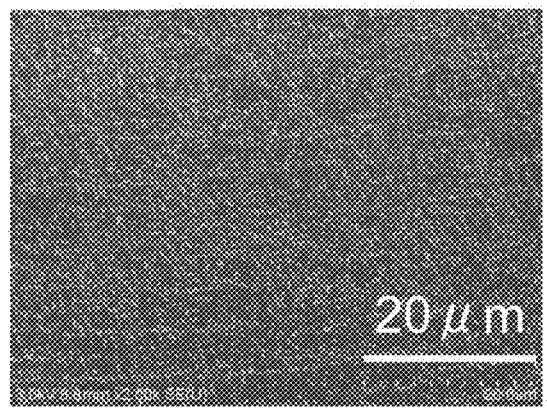
FIGS. 15A, B, and C are respectively photographs in which the surfaces of the ultraviolet light-generating targets of Examples 27, 33, and 38 on the aluminum layer sides are observed by an FE-SEM.
Figure 15B:
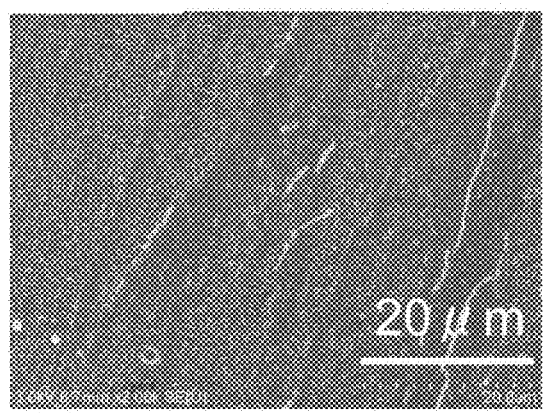
Figure 15C:
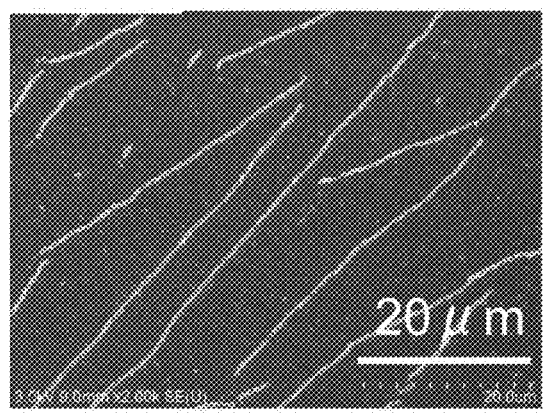

The making and evaluation of a light-emitting layer and an ultraviolet light-generating target were performed as in Example 1 except that the laser beam B irradiation time and the firing temperature were changed as shown in Table 3, and the firing atmosphere was changed to the air. The measurement results of In-plane X-ray diffraction (XRD) measurement in Examples 29 to 38 are shown in FIGS. 13A and 14A, and the emission spectrum measurement results in Examples 23 to 38 are shown in FIGS. 12, 13B, and 14B respectively. For Examples 27, 33, and 38, the surfaces of the ultraviolet light-generating targets on the aluminum layer sides were observed by an FE-SEM. Their photographs are shown in FIG. 15A (Example 27), FIG. 15B (Example 33), and FIG. 15C (Example 38) respectively.

TABLE 3

|  | Laser beam irradiation time (min) | Thickness of light-emitting layer (nm) | Emission intensity (mW) | XRD pattern FIGS. 13A and 14A) | Emission spectrum (FIGS. 12, 13B, and 14B) |
|---|---|---|---|---|---|
| Example 23 | 5 | 80 | 9.0 | — | G131 |
| Example 24 | 15 | 210 | 10.0 | — | G132 |
| Example 25 | 30 | 440 | 12.5 | — | G133 |
| Example 26 | 45 | 660 | 14.6 | — | G134 |
| Example 27 | 60 | 1100 | 14.8 | — | G135 |
| Example 28 | 90 | 1400 | — | — | G136 |
| Example 29 | 5 | 90 | 6.6 | G141 | G151 |
| Example 30 | 15 | 220 | 10.9 | G142 | G152 |
| Example 31 | 30 | 430 | 13.0 | G143 | G153 |
| Example 32 | 45 | 650 | 13.7 | G144 | G154 |
| Example 33 | 60 | 1100 | 15.6 | G145 | G155 |
| Example 34 | 5 | 80 | 11.2 | G161 | G171 |
| Example 35 | 15 | 210 | — | G162 | G172 |
| Example 36 | 30 | 420 | 12.2 | G163 | G173 |
| Example 37 | 45 | 680 | 12.9 | G164 | G174 |
| Example 38 | 60 | 1200 | 14.3 | G165 | G175 |

From FIGS. 12, 13B, and 14B, it is seen that for all of Examples 23 to 38, ultraviolet light can be generated over a wide wavelength range.

DESCRIPTION OF SYMBOLS

1 . . . electron beam-excited ultraviolet light source, 3 . . . electron source, 11 . . . ultraviolet light-generating target, 12 . . . substrate, 13 . . . light-emitting layer.

What is claimed is:
1. An ultraviolet light-generating target comprising:
   a substrate transmitting ultraviolet light; and
   a light-emitting layer provided on the substrate and emitting ultraviolet light in response to an electron beam,
   wherein the light-emitting layer is an amorphous layer formed of $Al_2O_3$ doped with Sc.
2. The ultraviolet light-generating target according to claim 1, wherein a thickness of the light-emitting layer is 2.0 μm or less.
3. The ultraviolet light-generating target according to claim 1, wherein a doping concentration of the Sc in the light-emitting layer is 4.0 atomic % or less.
4. An electron beam-excited ultraviolet light source comprising:
   the ultraviolet light-generating target according to claim 1; and
   an electron source providing the electron beam to the ultraviolet light-generating target.
5. The electron beam-excited ultraviolet light source according to claim 4, wherein a thickness of the light-emitting layer is 2.0 μM or less.
6. The electron beam-excited ultraviolet light source according to claim 4, wherein a doping concentration of the Sc in the light-emitting layer is 4.0 atomic % or less.
7. A method for manufacturing an ultraviolet light-generating target, comprising:
   vapor-depositing $Al_2O_3$ doped with Sc on a substrate transmitting ultraviolet light, to form an amorphous layer; and
   firing the amorphous layer.
8. The method for manufacturing an ultraviolet light-generating target according to claim 7, wherein a thickness of the amorphous layer is set at 2.0 μm or less.
9. The method for manufacturing an ultraviolet light-generating target according to claim 7, wherein a doping concentration of the Sc in the amorphous layer is set at 4.0 atomic % or less.

* * * * *